(12) United States Patent
Phirmis

(10) Patent No.: US 10,489,559 B2
(45) Date of Patent: Nov. 26, 2019

(54) METHOD FOR PROVIDING PROTECTED MULTIMEDIA CONTENT

(71) Applicant: VIACCESS, Paris la Défense (FR)

(72) Inventor: Mathieu Phirmis, Antony (FR)

(73) Assignee: VIACCESS, Paris la Défense (FR)

( * ) Notice: Subject to any disclaimer, the term of this patent is extended or adjusted under 35 U.S.C. 154(b) by 156 days.

(21) Appl. No.: 15/738,753

(22) PCT Filed: Jun. 23, 2016

(86) PCT No.: PCT/FR2016/051533
§ 371 (c)(1),
(2) Date: Dec. 21, 2017

(87) PCT Pub. No.: WO2017/001747
PCT Pub. Date: Jan. 5, 2017

(65) Prior Publication Data
US 2018/0181724 A1    Jun. 28, 2018

(30) Foreign Application Priority Data
Jul. 1, 2015  (FR) ...................... 15 56223

(51) Int. Cl.
*G06F 21/10*    (2013.01)
*H04N 21/254*   (2011.01)
*H04N 21/262*   (2011.01)
*G06F 21/62*    (2013.01)
*H04L 9/08*     (2006.01)

(52) U.S. Cl.
CPC .......... *G06F 21/10* (2013.01); *G06F 21/6209* (2013.01); *H04N 21/2541* (2013.01); *H04N 21/26258* (2013.01); *G06F 2221/2137* (2013.01); *H04L 9/0861* (2013.01)

(58) Field of Classification Search
CPC ................. G06F 21/10; G06F 21/6209; G06F 2221/2137; H04N 21/2541; H04N 21/26258; H04L 9/0861
USPC ........................................................ 726/29
See application file for complete search history.

(56) References Cited

U.S. PATENT DOCUMENTS 7,266,569 B2 *  9/2007  Cutter ..................... G06F 21/10
7,392,547 B2 *  6/2008  Cahill ..................... G06F 21/10
                                                          705/59

(Continued)

FOREIGN PATENT DOCUMENTS

WO      2005/091635      9/2005

*Primary Examiner* — Shahriar Zarrineh
(74) *Attorney, Agent, or Firm* — Occhiuti & Rohlicek LLP

(57) ABSTRACT

A method in which a network head-end associates with each segment of a list of at least one segment of a first segment block, a time datum that makes it possible to determine whether a deadline for sending an access rights request to an access rights server has changed; the network head-end sends to the terminal, together with each segment in the list, the associated time datum thereof; the terminal receives, together with each segment in the list, the associated time datum thereof, then changes a renewal deadline predetermined according to the last time datum received to obtain a new predetermined renewal deadline that enables the terminal to decide, according to the value thereof and at a given time before or equal to the changed deadline, to send an access rights request to the access rights server.

12 Claims, 2 Drawing Sheets

(56) References Cited

U.S. PATENT DOCUMENTS

| | | | | |
|---|---|---|---|---|
| 7,469,050 B2* | 12/2008 | Kouznetsov | G06F 21/10 | 380/284 |
| 7,549,062 B2* | 6/2009 | Kouznetsov | G06F 21/10 | 705/57 |
| 7,577,999 B2* | 8/2009 | Narin | G06F 21/10 | 705/59 |
| 7,716,288 B2* | 5/2010 | Graham | G06F 21/10 | 709/206 |
| 7,917,749 B2* | 3/2011 | Ginter | G06F 21/10 | 713/150 |
| 8,336,106 B2* | 12/2012 | Le Buhan | H04N 5/76 | 380/201 |
| 8,347,078 B2* | 1/2013 | Jain | G06F 21/10 | 380/285 |
| 8,474,054 B2* | 6/2013 | Vantalon | G06F 21/10 | 726/27 |
| 9,137,480 B2* | 9/2015 | Schlarb | G06F 21/10 | |
| 9,277,295 B2* | 3/2016 | Pinder | G06F 21/10 | |
| 9,609,279 B2* | 3/2017 | Morten | H04N 7/1675 | |
| 2003/0131353 A1* | 7/2003 | Blom | H04L 63/0428 | 725/25 |
| 2003/0140243 A1* | 7/2003 | Nusser | G06F 21/10 | 726/4 |
| 2004/0167858 A1* | 8/2004 | Erickson | G06F 21/10 | 705/55 |
| 2005/0078822 A1* | 4/2005 | Shavit | G06F 21/10 | 380/201 |
| 2005/0276416 A1* | 12/2005 | Zhu | H04N 7/1675 | 380/210 |
| 2006/0015580 A1* | 1/2006 | Gabriel | H04N 7/17309 | 709/219 |
| 2006/0200415 A1* | 9/2006 | Lu | G06F 21/10 | 705/50 |
| 2006/0200668 A1* | 9/2006 | Hybre | G06F 21/53 | 713/168 |
| 2006/0235800 A1* | 10/2006 | Furlong | G06F 21/105 | 705/59 |
| 2007/0079383 A1* | 4/2007 | Gopalakrishnan | G06K 9/00885 | 726/26 |
| 2007/0112676 A1* | 5/2007 | Kontio | G06F 21/10 | 705/50 |
| 2007/0239617 A1* | 10/2007 | Kim | G06F 21/10 | 705/59 |
| 2007/0283420 A1* | 12/2007 | Rantalahti | G06F 21/10 | 726/4 |
| 2008/0059216 A1* | 3/2008 | Fromentoux | G06F 21/10 | 709/205 |
| 2008/0316952 A1* | 12/2008 | Gruber | H04W 72/005 | 370/312 |
| 2009/0070122 A1* | 3/2009 | Hauck | G06F 21/10 | 705/313 |
| 2009/0183001 A1* | 7/2009 | Lu | G06F 21/10 | 713/168 |
| 2010/0080413 A1* | 4/2010 | Chen | G06F 21/10 | 382/100 |
| 2010/0241855 A1* | 9/2010 | Chou | G06F 21/10 | 713/168 |
| 2011/0184880 A1* | 7/2011 | Neumann | G06Q 20/123 | 705/344 |
| 2012/0008781 A1 | 1/2012 | Chevallier et al. | | |
| 2012/0017282 A1* | 1/2012 | Kang | G06F 21/10 | 726/26 |
| 2012/0090036 A1* | 4/2012 | Kang | G06F 21/10 | 726/27 |
| 2012/0144195 A1* | 6/2012 | Nair | H04L 63/0428 | 713/168 |
| 2013/0138956 A1* | 5/2013 | Swist | H04N 21/41415 | 713/168 |
| 2013/0340015 A1* | 12/2013 | Magis | H04L 12/2812 | 725/82 |
| 2014/0059349 A1* | 2/2014 | Boivin | H04N 21/25816 | 713/168 |
| 2014/0245463 A1* | 8/2014 | Suryanarayanan | G06F 21/31 | 726/28 |
| 2014/0281481 A1 | 9/2014 | Moroney | | |
| 2016/0044043 A1* | 2/2016 | Bouvet | G06F 21/10 | 726/1 |
| 2016/0165296 A1* | 6/2016 | Hamon | H04N 21/222 | 725/31 |
| 2016/0286245 A1* | 9/2016 | Lugeon | H04N 21/2347 | |

\* cited by examiner

METHOD FOR PROVIDING PROTECTED MULTIMEDIA CONTENT

RELATED APPLICATIONS

This application is the national stage of international application PCT/FR2016/051533, filed on Jun. 23, 2016, which claims the benefit of the Jul. 1, 2015 priority date of French application FR1556223.

FIELD OF INVENTION

The invention relates to multimedia distribution and in particular to protection of multimedia content.

BACKGROUND

In the context of multimedia distribution, a point-to-point link is a "unicast" link. Also referred to here by the term "point-to-multipoint" link is a broadcast link or a multicast link. The point-to-point link is a bidirectional link. The point-to-multipoint link is a unidirectional link from the sender to the receivers.

A client of a multimedia distribution service uses a terminal to access multimedia content. Accessing multimedia content means loading it into memory and lifting the protection therefrom on the fly as it is received or from a storage medium on which it has previously been stored. This permits the client to play it, to record it, or to make any other use thereof offered by a service for providing protected multimedia content.

Multimedia content includes audiovisual content, for example television programs, audio content alone, for example a radio program, or, more generally, any digital content containing video and/or audio such as a computer application, a game, a slideshow, a picture or any data set.

A particularly popular type of multimedia content is "temporal" multimedia content. Temporal multimedia content is multimedia content, the playing of which is a succession, in time, of sounds, in the case of an audio temporal content, or of pictures, in the case of a video temporal content, or of sounds and of pictures temporally synchronized with one another in the case of audiovisual temporal multimedia content. Temporal multimedia content can also comprise interactive temporal components synchronized with the sounds and the pictures.

The process of providing such content begins with coding or compressing it so transmission thereof will require less bandwidth.

To achieve such coding or compression, the video component of the content is coded according to a video format, such as MPEG-2. Many other formats, such as MPEG-4 ASP, MPEG-4 Part 2, MPEG-4 AVC (or Part 10), HEVC (High Efficiency Video Coding), or WMV (Windows Media Video) can alternatively be used, and rely on the same principles.

Such a coding method involves general data compression methods.

For fixed pictures, coding exploits the spatial redundancy internal to a picture, the correlation between the adjacent points and the lesser sensitivity of the eye to details.

For moving pictures, coding exploits the strong temporal redundancy between successive pictures. The use of the latter makes it possible to code certain pictures of the content, here called deduced pictures, with reference to others, here called source pictures, for example by prediction or interpolation, such that the decoding thereof is possible only after that of the source pictures. Other pictures, here called initial pictures, are coded without reference to such source pictures. These initial pictures, when encoded, contain, all the information necessary to be decoded. As such, they can be completely decoded independently of the other pictures. The initial pictures are thus the mandatory entry point in accessing the content.

The resulting coded content therefore does not comprise the data necessary for decoding each of the pictures independently of the others. Instead, it is made up of "sequences." A sequence produces the compression of at least one "group of pictures" or "GOP."

A group of pictures is a series of consecutive pictures in which each picture is either an initial and source for at least one deduced picture contained in the same series of consecutive pictures, or deduced and such that each of the source pictures necessary for the decoding thereof belongs to the same series of consecutive pictures, and not containing any smaller series of consecutive pictures and having these same properties. The group of pictures is thus the smallest part of content that can be accessed without having to first decode another part of this content. A "header" and an "end" delimit a sequence. These are each identified by a first specific code.

The header comprises parameters that characterize properties expected of the decoded pictures. Such properties might include horizontal and vertical sizes, ratio, and frequency. It is advantageous to repeat the header between groups of pictures of the sequence such that its successive occurrences are spaced apart by approximately a few seconds in the coded content. In a typical implementation, a group of pictures most commonly comprises 10 to 12 pictures representing a playing time of between 0.4 and 0.5 seconds in a 25 pictures-per-second system.

Temporal multimedia content can comprise several video components. In this case, each of these components is coded as described above.

The audio component of the content is also coded according to an audio format such as MPEG-2 audio.

Such a method for compressing audio temporal content obeys the same principles described above for that of video temporal content. The resulting coded content is therefore, analogously, made up of "frames." A frame is the audio analog of a group of pictures in video. The frame is therefore the smallest part of audio content that can be accessed without having to decode another part of this audio content. The frame further contains all the information useful to the decoding thereof.

For example, a frame comprises 384 or 1152 samples each coding a sound, representing, depending on the sampling frequency of the signal, a playing time of 8 to 12, or 24 to 36 milliseconds, i.e. typically a few tens of milliseconds.

Temporal multimedia content can comprise several audio components. In this case, each of these components is coded as described above.

The coded components of the multimedia content, also qualified as elementary data streams, are then multiplexed or synchronized, after which they are combined into a single data stream, also called a "multimedia stream," or a "stream."

Such content, particularly when it is the subject of rights such as copyrights or neighboring rights, is provided protected by a multimedia content protection system that makes it possible to ensure the observance of conditions of access to the content that evolves from these rights.

Such content is then typically provided encrypted by virtue of its protection by a digital rights management, or DRM, system. This encryption is generally performed by an encryption key or by a symmetrical algorithm. It is applied to the stream resulting from the multiplexing or, before multiplexing, to the components of the coded content.

A DRM system is in fact a multimedia content protection system. The terminology of the field of digital rights management systems is thus used herein.

Accessing duly-protected temporal multimedia content more specifically means successively accessing, on the fly as they are received, successive segments. Such accessing includes loading successive segments of multimedia content into memory, removing the protection therefrom, decoding the segments, and transmitting them to a multimedia device. The multimedia device will then play them, store them, or any other use thereof offered by the service for providing protected multimedia contents.

Access to the protected temporal multimedia content will be described hereinafter only with a view to the playing thereof. The access procedure is ultimately agnostic to what the terminal will do with the multimedia content.

A "segment" describes a restricted part of the multimedia stream that is uncoded, the playing of which has a duration less than that of the playing of the entire multimedia stream. A segment therefore comprises a restricted part of each video or audio component of the uncoded multimedia stream, the playing of which has one and the same duration less than that of the playing of the entire multimedia stream. These restricted parts of components are synchronized in the stream to be played simultaneously. A segment therefore comprises the restricted part of the temporal series of video sequences or of groups of pictures, or of audio frames producing the coding of this restricted component part of the uncoded multimedia stream. This restricted part consists of a plurality of successive video sequences or groups of pictures or audio frames.

The term "successive" means immediately following one another without being separated in the temporal progress of the content by other video sequences or groups of pictures or audio frames. Typically, a segment comprises more than ten, one hundred, one thousand, or ten thousand groups of successive video pictures of one and the same coded video component of the stream, or more than ten to one hundred times more successive audio frames of one and the same coded audio component of the stream.

As used herein, an "uncoded" multimedia stream or segment is one that no longer needs to descrambling to be played by a multimedia device.

As used herein, "multimedia device" describes any device capable of playing the uncoded multimedia stream, such as a television or a multimedia player.

As used herein, "on the fly" means that segments of multimedia content are processed as they are received, without waiting for all segments of the complete multimedia content to have been entirely received.

In such a digital-rights management system, so as to improve the protection thereof, the content is provided, by the system for providing protected multimedia contents, split into several successive content segments individually protected by the digital rights management system. These segments are therefore ordered temporally relative to one another.

More specifically, a specific content key Ks, uses a symmetric algorithm to encrypt each segment $S_i$. This content key $K_{si}$ is "specific" because it is only used to encrypt this segment $S_i$ out of all the segments of the multimedia content.

As such, it is useful to characterize a segment $S_i$ not by its structure but by the segment key Ks, used to encrypt it. A segment is therefore the plurality of immediately successive video sequences and audio frames encrypted with one and the same segment key $K_{si}$.

In such a digital-rights management system, obtaining an intermediate license $L_i$ allows a terminal to access a segment $S_i$. The intermediate license $L_i$ comprises an access right necessary for a terminal to access a segment of the content. The access right typically comprises a cryptogram $(K_{si})*K_{Gp}$. The access right may also comprise an access rule that describes those uses of the protected multimedia content that the terminal is authorized to make.

To further improve the protection of the content, an intermediate level of encryption of the keys $K_{si}$ is used. This makes it possible to change, during the temporal progress of the content, the encryption keys $K_{Gp}$ used to compute the cryptograms $(K_{si})*K_{Gp}$ transported in the licenses $L_i$.

The segments are grouped together in blocks of segments. Each block contains only a restricted part of the segments of the content. Typically, each block contains at least one segment and, generally, several successive segments. Successive should be understood here to mean immediately following one another, without being separated, in the temporal progress of the content, by segments not belonging to the block concerned.

An intermediate key $K_{Gp}$ is associated with each of these blocks. The segment key $K_{si}$ necessary to the decryption of a segment is encrypted with the intermediate key $K_{Gp}$ associated with the block to which this segment belongs. The resulting cryptogram $(K_{si})*K_{Gp}$ is then inserted into the license $L_i$ transmitted jointly with this segment.

The license L comprises an identifier of a terminal license $L_p$, which itself comprises the cryptogram $(K_{Gp})*K_T$ of the intermediate key $K_{Gp}$ obtained by encryption of this intermediate key $K_{Gp}$ with the terminal key $K_T$.

A block of segments is not therefore characterized by its structure but by the intermediate key $K_{Gp}$ used to encrypt each key $K_{si}$ of all the segments of this block. A block is therefore formed by all the segments whose segment key $K_{si}$ is encrypted with one and the same intermediate key $K_{Gp}$.

In such a system, a terminal receives, jointly with an encrypted segment, an intermediate license $L_i$ comprising the cryptogram $(K_{si})*K_{Gp}$ of the content key necessary to decryption that segment.

To access the content in order to make use thereof, the terminal extracts the access right from the license $L_i$.

To access the segment, the terminal must first obtain the terminal license $L_p$ that comprises the cryptogram $(K_{Gp})*K_T$. The terminal obtains this license $L_p$ by submitting an access-rights request to the access-rights server. This request is submitted "out-of-band" over a point-to-point link between the terminal and the access-rights server. The response from the access-rights server is also transmitted to the terminal by this same point-to-point link.

The terminal then evaluates the license $L_p$. If the result of this evaluation is positive, the terminal decrypts the cryptogram $(K_{Gp})*K_T$ using its terminal key $K_T$. If the result of this evaluation is negative, the terminal inhibits the use of the license $L_p$, and in particular does not decrypt the cryptogram $(K_{Gp})*K_T$ that it comprises. It thus prohibits access to the block of protected segments by virtue of the keys $K_{si}$ having been encrypted using this intermediate key $K_{Gp}$.

In the case where the terminal has not received the license $L_p$, it likewise inhibits its processing, and thus prohibits access to the block of protected segments currently being received. The result thereof, for the user of the terminal, is an interruption in the playing of the content.

It is therefore important for the terminal to obtain the license $L_p$ associated with the next block of segments to be received sufficiently in advance of receiving the next block of segments. The moment at which receiving the next block of segments starts defines the moment of the next intermediate-key rotation in the stream. This is the process of "license pre-delivery."

To guarantee pre-delivery of the license $L_p$, any license $L_p$ transmitted to a terminal comprises a limit date before which that terminal must request the next terminal license $L_{p+1}$ from the access-rights server. The next date at which the terminal must connect to the access-rights server to request the next terminal license is called the "renewal expiration date." When this renewal expiration date is reached, the terminal submits an access-rights request to the access-rights server. In response, the access-rights server transmits the next terminal license $L_{p+1}$ to the terminal.

SUMMARY

From time to time, it is desirable to delay the limit date before which the terminal must request the next terminal license $L_{p+1}$ from the access-rights server. For example, such is the case when there are connection problems between the terminal and the access-rights server or when the access-rights server is unavailable. It may also be desirable to advance this limit date. For example, this can be used as a countermeasure in response to attacks against the security of the service or of the system for providing protected multimedia contents.

In some cases, it is difficult to subsequently modify the limit date before which the terminal must request the next terminal license $L_{p+1}$ from the access-rights server. In effect, to this end, it would be necessary to rebroadcast new current terminal licenses to each of the terminals with a new limit date.

Another difficulty arises from systematically choosing the renewal expiration date to be equal to this limit date. Consequently, the renewal expiration date is the same for all the terminals. This creates a traffic jam. All the terminals submit their respective access-rights request to the access-rights server on the same day. The result is a peak in the computation load of the access-rights server and in network traffic.

In such a method, the point-to-multipoint link transmits a temporal datum to all the terminals. This temporal datum makes it possible to determine whether the limit date for transmitting the access-rights request to the access-rights server has changed. Thus, the transmission thereof makes it possible to notify the terminal of any change to this limit date.

In response to such a change, each terminal modifies its renewal expiration date. This renewal expiration date allows the terminal to decide, as a function of its value and at a given instant, to transmit an access-rights request to the access-rights server. Such a method therefore makes it possible to modify the renewal expiration date of the terminal, and therefore the instant given above, without having to transmit a new license via a point-to-point link to each of the terminals and therefore to remedy the first drawback cited. This notification solution, relying largely on the existing system and requiring little development in the head end and the terminals, is also simple and inexpensive.

In another aspect, the invention includes a method for sending, by a head end, for the implementation of the provision method claimed, protected multimedia content.

In yet another aspect, the invention includes a method by which the terminal obtains protected multimedia content using the content-providing method as described herein.

The methods described herein offer several improvements to the technology of multimedia-content transmission.

One improvement to the technology of multimedia-content transmission arises because testing one of the conditions $DS_i > DS_{i+1} + \Delta T_1$ and $DS_i \geq DS_{i-1} \Delta T_1$ makes it possible to modify the predetermined renewal expiration date only when the limit date has been delayed by at least $\Delta T_1$.

Another improvement is that testing of one of the conditions $DS_i < DS_{i-1} - \Delta T_2$ and $DS_i \leq DS_{i-1} - \Delta T_2$ makes it possible to modify the predetermined renewal expiration date only when the limit date has been advanced by at least $\Delta T_2$.

Yet another improvement is that modifying the predetermined renewal expiration date by assigning to it a value computed by means of a function capable of uniformly allocating the predetermined renewal expiration dates of the terminals makes it possible to smooth the computation load of the access-rights server and the network traffic.

Yet another improvement is that triggering the immediate transmission to the access-rights server of the access-rights request if the last temporal datum received is equal to a pre-stored code makes it possible to use the temporal datum to fulfill two different functions. These functions are modifying the renewal expiration date and, alternately, triggering the transmission of the access-rights request independently of the predetermined renewal expiration date.

In another aspect, the invention includes a tangible and not-transitory machine-readable information storage medium comprising instructions for the implementation of one of the methods claimed by an electronic computer.

Another aspect of the invention is a head end for the implementation of the sending method claimed.

Yet another aspect of the invention is a terminal the method of obtaining multimedia content as described herein.

Like any method, methods of obtaining multi-media content can be implemented in an abstract or non-abstract manner. The subject matter of the claims is strictly limited to non-abstract implementations and systems. Abstract implementations are not included in the claims.

Methods as described herein can be implemented by abstract systems or non-abstract systems. The claims are limited to non-abstract systems. These systems are made of matter and consume energy during operation. Abstract systems are not covered by the claims.

BRIEF DESCRIPTION OF THE DRAWINGS

The invention will be better understood on reading the following description, given purely as a non-limiting example, and with reference to the drawings in which.

In these figures, the references are used to denote the same elements.

DETAILED DESCRIPTION

Figure 1:
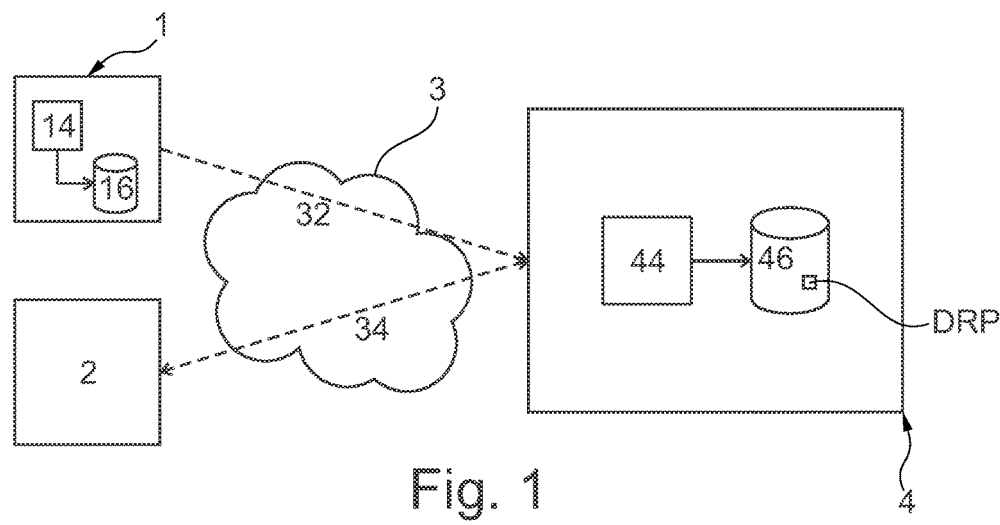
FIG. 1 shows the architecture of a system for providing protected multimedia content.

FIG. 1 represents a system for providing protected multimedia content. Such a system comprises a plurality, typically thousands, of terminals, mechanically independent of one another, linked, via a network 3, on the one hand to a head end 1, and on the other hand to an access-rights server 2. Here, it is assumed that all these terminals are identical. Thus, to simplify the illustration, only one terminal 4 is represented in FIG. 1. A terminal 4 is capable of accessing content to play it. The head end 1 is capable of protecting content and of transmitting the protected content to the terminal 4.

A terminal 4 comprises a programmable electronic computer 44 and a memory 46.

The computer 44 is capable of executing instructions stored in the memory 46. Typically, the computer 44 is a microprocessor such as an Itanium microprocessor from the company Intel.

Figure 5:
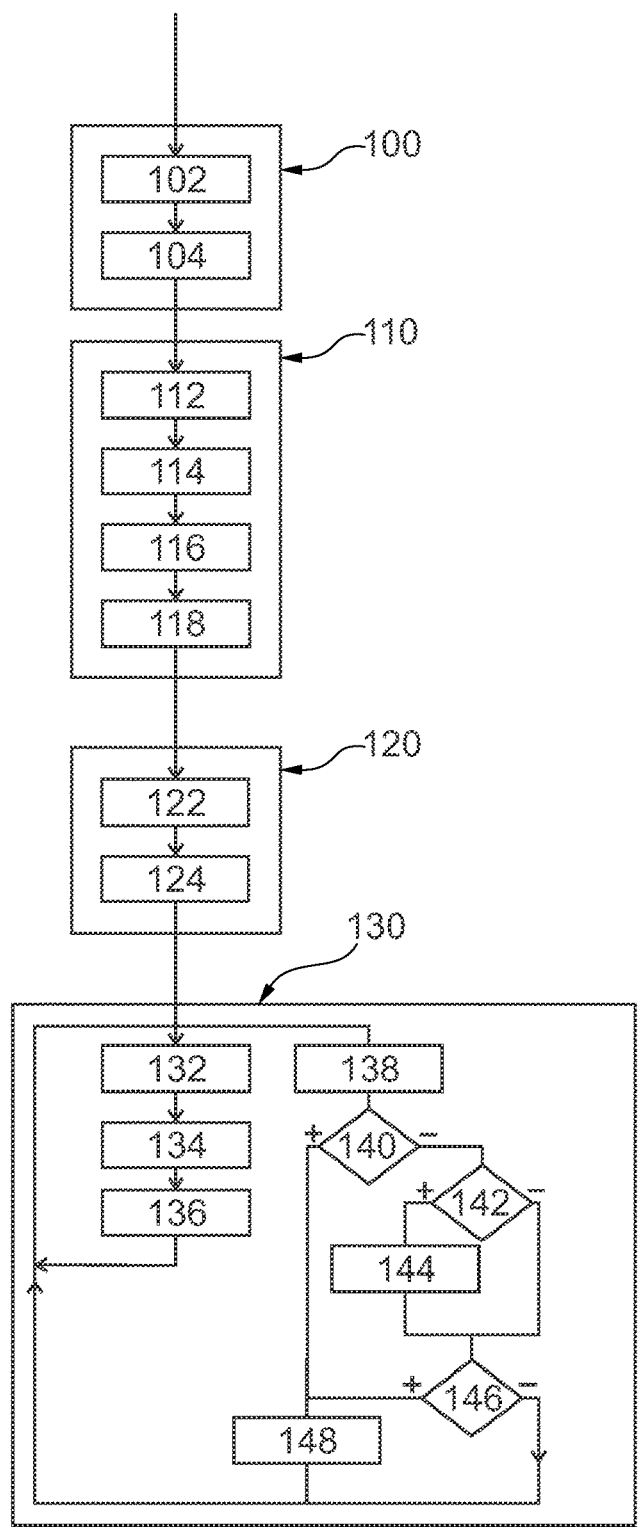
FIG. 5 is a representation of a method for providing protected multimedia content using the architecture of FIG. 1.

The memory 46 comprises the instructions necessary to execute the method of FIG. 5. The memory 46 also comprises a predetermined renewal expiration date DRP. The expiration date DRP allows the terminal to decide, as a function of its value and at a given instant, to transmit an access-rights request to the access-rights server. In the embodiment described herein, the expiration date DRP is expressed in the form of a remaining duration before the next date at which the terminal 4 will automatically trigger the transmission of an access-rights request to the server 2.

The network 3 is a wide area information distribution network making it possible to establish a point-to-multipoint communication link 32 between the head end 1 and the terminal 4. The network 3 also makes it possible to establish a point-to-point communication link 34 between the terminal 4 and the server 2. For example, the network 3 is the World Wide Web, better known as the "Internet network."

Like the terminal 4, the head end 1 comprises a programmable electronic computer 14 and a memory 16.

The computer 14 is capable of executing instructions stored in the memory 16. Typically, the computer 14 is a microprocessor such as a Tegra microprocessor from the company Nvidia or a Cortex-A8 processor from the company ARM. The memory 16 comprises instructions necessary to execute the method of FIG. 5.

The access-rights server 2 is capable of providing the terminal 4, in response to a request, with a terminal license comprising an access right necessary to access multimedia content previously acquired by the terminal 4.

Figure 2:
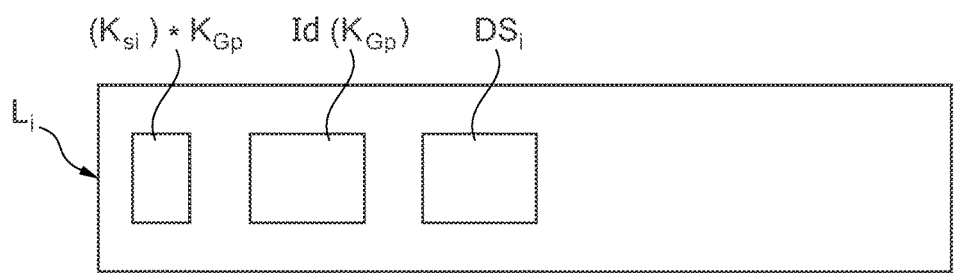
FIG. 2 is a representation of an intermediate license.

FIG. 2 represents an intermediate license $L_i$. This license $L_i$ comprises a cryptogram $(K_{si})*K_{Gp}$ obtained by encrypting a content key Ks, with an intermediate key $K_{Gp}$. The content key $K_{si}$ is the key used to encrypt the segment $S_i$ of the multimedia content. The intermediate key $K_{Gp}$ is the key used to encrypt the content keys $K_{si}$ of all the segments of the block $G_p$. The license $L_i$ also comprises an identifier $Id(K_{Gp})$ that identifies the intermediate key $K_{Gp}$. The license $L_i$ further comprises a temporal datum $DS_i$ that makes it possible to determine whether the limit date $D_{Gp}$ for transmitting the access-rights request to the access-rights server 2 has changed, either by having been advanced or by having been delayed. Furthermore, the temporal datum $DS_i$ also makes it possible to modify the expiration date DRP in response to a change of the limit date $D_{Gp}$.

The temporal datum $DS_i$ is a duration remaining before a limit date $D_{Gp}$ is reached. The limit date $D_{Gp}$ is the date before which the terminal 4 must transmit, to the access-rights server 2, an access-rights request to be able to obtain the license $L_{p+1}$ before beginning to receive the block $G_{p+1}$. The license $L_{p+1}$ comprises the access right necessary to access any segment of the next block $G_{p+1}$. The limit date is therefore a date prior to the start of the transmission of the block $G_{p+1}$ and generally after the start date of the transmission of the block $G_p$. Typically, the limit date is equal to the date scheduled to begin the transmission of the block $G_{p+1}$ minus a predetermined safety margin $\Delta DL$.

In embodiment described herein, the datum $DS_i$ is linked to the limit date $D_{Gp}$ by the relationship: $D_{Gp}=Deb_{si}+DS_i$, in which $Deb_{si}$ is equal to the start date of the reception of the segment $S_i$.

The temporal datum $DS_i$ is typically computed, by the head end 1, as a function of the playing time of a segment by the terminal, also called the "cryptoperiod," and of the number of segments remaining before the end of the current block $G_p$ of segments. It is, for example, expressed in seconds or as a number of cryptoperiods. In the embodiment described herein, its value is counted by taking, as a time origin, the date $Deb_{si}$ of start of the reception of the segment $S_i$. Thus, as long as the limit date $D_{Gp}$ is unchanged, the temporal datum $DS_i$ decreases by the duration of a cryptoperiod each time a new segment of the block $G_p$ is sent. In the particular case where the temporal datum $DS_i$ lies between zero and a threshold $\Delta Tc$ that is positive or nil, equal to zero, or negative, the limit date $D_{Gp}$ is, respectively, called imminent, equal to the current date, or past. For example, $\Delta Tc$ is equal to $n \times \Delta t$, in which: $\Delta t$ is the average duration that elapses between the instant where the terminal 4 sends an access-rights request and the instant where, in response, it receives the license $L_{p+1}$, and n is a predetermined number, greater than or equal to 1 and, generally, less than 2 or 3. In the embodiment described herein, n is equal to one. Here, in this case where the limit date $D_{Gp}$ is imminent, equal to the current date, or past, the head end 1 assigns for value, to the temporal datum $DS_i$, a pre-stored code. For example, the pre-stored code has the value zero.

Figure 3:
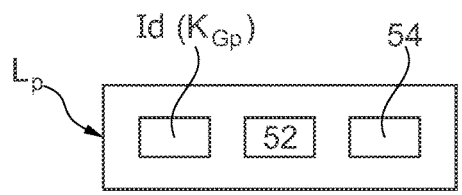
FIG. 3 is a representation of a terminal license.

FIG. 3 represents a terminal license $L_p$ having an access right 52. The access right 52 comprises the intermediate key $K_{Gp}$ or a cryptogram of the intermediate key. The license $L_p$ also comprises the identifier $Id(K_{Gp})$ of the intermediate key $K_{Gp}$. Finally, the license $L_p$ may comprise a temporal datum 54 that makes it possible to compute an initial limit date for transmitting the access-rights request to the access-rights server 2. In some cases, the temporal datum 54 is a date. It is therefore no longer modifiable once the license $L_p$ has been received and processed by the terminal 4, without transmission, by the access-rights server 2, of a new license to the same terminal.

Figure 4:
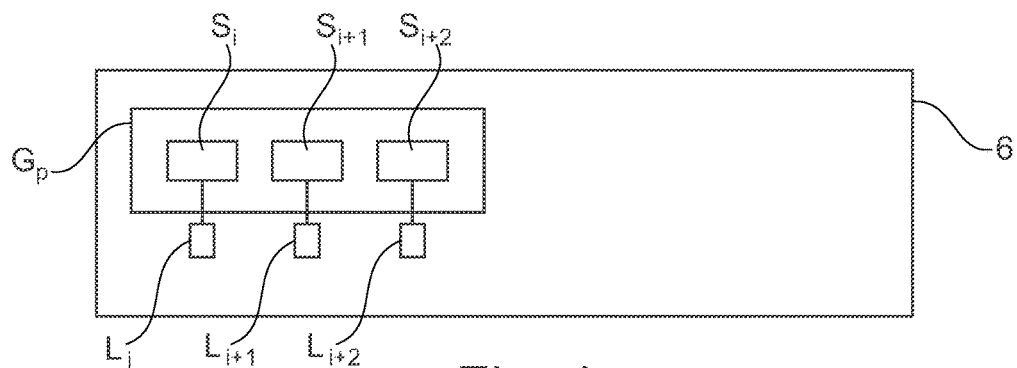
FIG. 4 is a representation of a stream transmitted by a head end to a terminal.

FIG. 4 represents a stream 6 transmitted by the head end 1 to all the terminals 4. The stream 6 comprises several blocks of segments of multimedia content. For example, the stream 6 comprises more than two, ten, or one hundred blocks of segments. In the embodiment described herein, it is assumed that all these blocks are structurally identical and differ from one another only by the content encoded in each of the segments. In particular, all the blocks comprise the same number of segments. To simplify FIG. 4, only one block $G_p$ as been shown h for further description.

The block $G_p$ comprises a plurality of segments. Typically, the block $G_p$ comprises more than ten or one hundred successive segments. The block $G_p$ comprises only a restricted part of all the segments whose concatenation forms the totality of the multimedia content broadcast. Only three segments $S_i$, $S_{i+1}$ and $S_{i+2}$ have been represented in FIG. 4. All these segments are structurally identical and differ from one another only by the information encoded in each of them.

The segment $S_i$ has the intermediate license $L_i$ associated with it, which is transmitted jointly with this segment in the stream 6. In the embodiment described herein, this association is produced by temporal synchronization of the segment $S_i$ and of the intermediate license $L_i$ in the stream. This synchronization is itself produced by the adjacency of the segment $S_i$ and of the intermediate license $L_i$ in the stream, and, when the time comes, by their joint transmission. In FIG. 4, the intermediate licenses associated with the segments $S_{i+1}$ and $S_{i+2}$ respectively bear the numeric references $L_{i+1}$ and $L_{i+2}$.

The operation of the system of FIG. 1 will now be described with reference to the method of FIG. 5.

The method begins with a multi-media packaging phase 100. At the start of this multi-media packaging phase 100, the head end 1 receives, from the terminal 4, a request to obtain content (step 102). This request contains an identifier of a terminal key $K_T$. Each terminal is manufactured or customized to have a unique terminal key $K_T$. The head end 1 obtains the terminal key $K_T$ when the terminal 4 registers, long before the implementation of the method of FIG. 5.

Next, the head end 1 acquires the uncoded temporal multimedia content, encodes it, then protects using a multimedia-content protection system (step 104).

To protect the encoded multimedia content, the head end 1 splits it into several successive content segments $S_i$. These segments $S_i$ are ordered temporally in relation to one another. The complete series of segments constitutes the multimedia content. Hereinafter, the index "i" is the order number of the segment $S_i$ in this temporal series of segments.

The head end 1 then ensures the individual protection, by a digital-rights management system, of each of the segments $S_i$. To do so, the head end 1 encrypts each segment $S_i$ with a specific key $K_{si}$. The specific key $K_{si}$ is not used to encrypt any other segment in the same series of segments.

Next, the head end 1 constructs blocks $G_p$ of successive segments. The index "p" is the order number of the block in the duly-constituted series of successive blocks. The head end 1 sets the number of segments contained in each block. For each block that has this number of successive segments, the head end 1 generates an intermediate key $K_{Gp}$. It then uses the intermediate key $K_{Gp}$ to encrypt each specific key $K_{si}$ associated with a segment $S_i$ of the block $G_p$. As a result, it obtains, for each segment $S_i$ of the block $G_p$, the cryptogram $(K_{si})^*K_{Gp}$. The head end 1 then inserts the identifier $Id(K_{Gp})$ of the intermediate key $K_{Gp}$ and the cryptogram $(K_{si})^*K_{Gp}$ in the license $L_i$ that it associates with that segment $S_i$, as described with reference to FIG. 4.

The head end 1 then continues with a sending phase 110 to send the multimedia content that was packaged in the packaging phase 100.

The sending phase 110 begins with the head end 1 encrypting each intermediate key $K_{Gp}$ with the terminal key $K_T$, to obtain the cryptogram $(K_{Gp})^*K_T$ (step 112). Then, for each block $G_p$, the head end 1 inserts, as the access right 52 to this block, the cryptogram $(K_{Gp})^*K_T$ in the terminal license $L_p$ intended for the terminal 4. The identifier $Id(K_{Gp})$ of the intermediate key $K_{Gp}$ is also inserted into the license $L_p$. Since the identifier $Id(K_{Gp})$ is also contained in the license $L_i$ associated with any segment $S_i$ of the block $G_p$, the license $L_p$ is thus also associated with each of the segments $S_i$, and therefore with the block $G_p$.

In some practices, step 112 also includes having the head end 1 insert the temporal datum 54 into the license $L_p$. However, the method described hereinafter works even if the temporal datum 54 is not inserted into the license $L_p$.

Next, the head end 1 associates its temporal datum $DS_i$ with each of the segments $S_i$ (step 114). Then, the head end 1 inserts this temporal datum $DS_i$ into the license $L_i$ associated with the segment $S_i$. The temporal datum $DS_i$ is preferably inserted, fully protected, into the license $L_i$. This associates a temporal datum $DS_i$ with each segment $S_i$ of the block $G_p$.

The head end 1 thus generates, step-by-step, a stream 6. This stream 6 includes each of the segments $S_i$ of the block $G_p$ and, for each segment $S_i$, its associated license $L_i$, which itself includes the temporal datum $DS_i$.

Finally, the head end 1 transmits the license $L_p$ constructed for the terminal 4 to the access-rights server 2, which stores it.

The access-rights server 2 then transmits the license $L_p$ to the terminal 4 via the link 34 (step 116). Typically, this transmission takes place in response to the access-rights server 2 having received an access-rights request from the terminal 4 over the link 34.

The head end 1 next transmits the stream 6 to the terminal 4 via the link 32 (step 118). The steps 116 and 118 are synchronized such that the step 116 precedes the step 118. As a result, the terminal 4 receives and processes the license $L_p$ before the block $G_p$ is played.

The method continues with a reception phase 120. During the phase 120, the terminal receives, in a step 122, the license $L_p$, and, in a step 124, the stream 6. Because of the synchronization of the steps 116 and 118, the steps 122 and 124 are themselves synchronized such that the step 122 precedes the step 124.

The terminal then receives, one after the other, each of the segments $S_i$ of the block $G_p$ and the associated license $L_i$ (step 124).

Next, the terminal executes a playing phase 130 for each of the segments $S_i$ of the stream 6 that it receives.

The playing phase 130 begins when the terminal extracts the segment $S_i$ and its license $L_i$, from the stream 6 (step 132).

Next, the terminal 4 extracts the identifier $Id(K_{Gp})$ of the intermediate key $K_{Gp}$ from the license $L_i$ and searches for the license $L_p$ that has the same identifier $Id(K_{Gp})$ (step 134).

If the access right 52 of the license $L_p$ thus found has not already been extracted therefrom since the start of the playing phase, then the terminal 4 extracts it therefrom.

The terminal 4 then uses the access right 52 to authorize or prohibit access to the segment $S_i$. (step 136).

In the embodiment described herein, the terminal 4 extracts the cryptogram $(K_{Gp})^*K_T$ from the access right 52 and decrypts the cryptogram $(K_{Gp})^*K_T$ with its terminal key $K_T$. It thus obtains the uncoded intermediate key $K_{Gp}$.

The terminal 4 then decrypts the cryptogram $(K_{si})^*K_{Gp}$ with the intermediate key $K_{Gp}$. It thus obtains the key $K_{si}$ in uncoded form.

Finally, the terminal 4 decrypts the cryptogram of the segment $S_i$ with the key $K_{si}$ and obtains the segment $S_i$ in uncoded form. The terminal 4 then transmits the uncoded segment $S_i$ to a multimedia device, which then proceeds to play it.

In some embodiments, access to the segment $S_i$ is prohibited if the access right 52 does not contain any cryptogram $(K_{Gp})*K_T$ or if it contains an erroneous cryptogram, i.e. one that cannot be correctly decrypted with the terminal key $K_T$.

In some cases, the access right 52 comprises an access rule that describes those uses of the protected multimedia content that the terminal 4 is authorized to make. If those uses do not include having a multimedia device play the content, then access to the segment $S_i$ can also be prohibited.

In parallel with the steps 134 and 136, if the terminal license $L_{p+1}$ has not already been obtained by the terminal 4, the terminal 4 implements steps 138 to 148.

In step 138, the terminal 4 extracts the temporal datum $DS_i$ associated with the segment $S_i$ from the license $L_i$.

Then, in step 140, the terminal 4 compares the temporal datum $DS_i$ to the pre-stored code. If the value of the temporal datum $DS_i$ is equal to the pre-stored code, the terminal immediately proceeds with step 148. Otherwise, the terminal implements step 142.

In step 148, the terminal 4 immediately transmits an access-rights request to the access-rights server 2. In response, the access-rights server 2 repeats step 116 to transmit the license $L_{p+1}$ to the terminal. The license $L_{p+1}$ comprises the access right necessary to access any segment of the block $G_{p+1}$.

Thus, when, in step 140, the temporal datum $DS_i$ is equal to the pre-stored code, the terminal 4 triggers transmission of the access-rights request independently of the predetermined renewal expiration date DRP stored in its memory 46.

In step 142, the terminal determines whether the temporal datum $DS_i$ satisfies at least one of a first and second condition. The first condition is that $DS_i > DS_{i-1} + \Delta T_1$, and the second condition is that $DS_i < DS_{i-1} - \Delta T_2$, wherein $\Delta T_1$ and $\Delta T_2$ are zero or positive predefined constants.

The first condition arises in those cases in which the limit date $D_{Gp}$ for transmitting the access-rights request to the access-rights server 2 has been pushed back by at least $\Delta T_1$. In the example described herein, $\Delta T_1=0$. The second condition arises in those cases in which the limit date $D_{Gp}$ for transmitting the access-rights request to the access-rights server 2 has been advanced by at least $\Delta T_2$.

In the embodiment described herein, $\Delta T_2$ is equal to a strictly positive multiple of the duration of a cryptoperiod For example, $\Delta T_2$ is then greater than 2 or 3 times the duration of a cryptoperiod.

If one of the first and second conditions is satisfied, the terminal implements steps 144 then 146. Otherwise, it proceeds directly to step 146.

In step 144, the terminal 4 modifies the current renewal expiration date DRP as a function of the temporal datum $DS_i$ received to obtain a new renewal expiration date. This new expiration date DRP allows the terminal to decide, as a function of its value and at a given instant prior to or equal to the modified limit date, to transmit an access-rights request to the access-rights server.

For this to occur, the new renewal expiration date is drawn randomly or pseudo-randomly from the interval lying between 0 and the last temporal datum $DS_i$ received. This new renewal expiration date DRP then replaces the preceding renewal expiration date in the memory 46.

In step 146, the terminal 4 determines whether the expiration date DRP stored in its memory is reached. To do so, the terminal 4 compares the renewal expiration date DRP stored in its memory 46 with a predetermined positive or zero threshold $\Delta Td$. If the expiration date DRP is negative, zero, or lies between 0 and $\Delta Td$, the terminal 4 then implements step 148. Otherwise, the terminal 4 inhibits step 148, stores $DS_i$ instead of and in place of $DS_{i-1}$ as the last temporal datum received, and updates the expiration date DRP. In the example described herein, the updating of the expiration date DRP includes decrementing the expiration date DRP by the duration $DS_{i-1} - DS_i$. This duration is the duration of a cryptoperiod. Next, the updated expiration date DRP is stored in the memory 46 in place of the old expiration date. In some embodiments, $\Delta Td$ is equal to $n \times \Delta t$, where $\Delta t$ is the average duration which elapses between the instant when the terminal 4 sends an access-rights request and the instant where, in response, it receives the license $L_{p+1}$, and n is a predetermined number greater than or equal to 1 and, generally, less than 2 or 3. In this example, n is equal to one. For example, $\Delta Td$ is equal to $\Delta Tc$.

Many other embodiments of the invention are possible. In some examples, the content is provided in form that has been protected by a digital-rights management system but without having been encrypted. In such cases, it is not necessary to include the cryptogram $(K_{si})*K_{Gp}$ in the access data inserted into the license $L_i$.

In another embodiment, the multimedia content is provided protected by a conditional=access system.

In another embodiment, the content is protected by another type of content-protection system, such as, f a more conventional data-protection system that does not perform access-rights management. In such cases, the method described herein is applied to providing the messages necessary for routing the decryption keys, for example.

In another embodiment, it is not necessary for all segments of a block of content segments to follow one another in the temporal progression of the content. In such embodiments it is possible for some segments to be separated by segments that do not belong to the block concerned.

In some embodiments, a terminal 4 shares its terminal key $K_T$ with one or more terminals.

In other embodiments, there is no pre-stored code assigned to the temporal datum $DS_i$ if the limit data is imminent, equal to the current date or past it. In such cases, step 140 includes comparing the temporal datum $DS_i$ to the threshold $\Delta Tc$. If the temporal datum $DS_i$ is less than the threshold, then step 148 is directly executed. Otherwise, the method continues with the execution of step 142. In this embodiment, it is not necessary to use a pre-stored code.

In yet another embodiment, the expiration date DRP is the next date at which the terminal 4 will automatically trigger the transmission of an access-rights request to the access-rights server 2. In such a case, step 146 includes having the terminal 4 compare the expiration date DRP stored in its memory with the current date. If the expiration date DRP has already past, is equal to the current date, or is imminent, then the terminal 4 implements step 148. Otherwise, the terminal 4 inhibits the implementation of step 148. An expiration date DRP is imminent when it lies between the current date Dc and $Dc+\Delta Td$, where $\Delta Td$ is the previously defined threshold.

In this case, the terminal 4 obtains a current date by any means. The terminal 4 can obtain the current date from a date server to which the terminal 4 is linked via the network 3 or from a clock incorporated in the terminal 4. Alternatively, the terminal 4 can compute the current date from a quantity that represents the time that elapses and that is transmitted in the stream 6. Furthermore, in this variant, step 144 consists, for example, in randomly or pseudo-randomly drawing a new expiration date DRP from the range of dates lying between the current date and the changed limit date $D_{Gp}$. The changed limit date $D_{Gp}$ is for example computed using the following relationship: $D_{Gp} = Deb_{si} + DS_i$.

In some embodiments, the network 3 includes a first sub-network that supports the point-to-multipoint link 32 and a second sub-network that supports the point-to-point link 34. Among these embodiments are those in which the first sub-network is a satellite transmission network and the second sub-network is the Internet network.

In some embodiments, the access-rights server 2 is incorporated in the head end 1.

In other embodiments, it is not the case that ever license $L_i$ includes a temporal datum $DS_i$. For example, out of the licenses $L_i$ associated with the segments of one and the same block $G_p$, only fewer than one in two or less than one in five, or less than one in ten, or less than one in fifty have a temporal datum $DS_i$. The only segments $S_i$ of the block $G_p$ that are associated with a temporal datum $DS_i$ form a list of segments of the block $G_p$. In such a case, the steps 138 to 148 are executed only for the segments of this list. Then, the more segments there are in this list, the more numerous the opportunities are to modify the renewal expiration date DRP, and therefore the more flexible the method is. Moreover, the more evenly distributed the segments of the list are in the block $G_p$, the more opportunities there are to modify the renewal expiration date too. That also makes the method more flexible.

In a last example, a temporal datum $DS_i$ is inserted into the license $L_i$ only when needed. This might be, for example, when the renewal expiration date has to be modified. In such cases, just one of the licenses $L_i$ has a temporal datum $DS_i$.

In other embodiments, the temporal datum $DS_i$ is a date. An example of such a date is the limit date $D_{Gp}$ at which the terminal must transmit, to the access-rights server 2, an access-rights request to obtain the license $L_{p+1}$ before beginning to receive the block $G_{p+1}$. The temporal datum $DS_i$ can also be a date $DL_i$ such that the new limit date is computed as follows: $D_{Gp}=DL_i-\Delta Tl$, where $\Delta Tl$ is a positive or zero predetermined duration. In some examples, $\Delta Tl$ is equal to $\Delta Tc$.

In this case, in step 144, the new renewal expiration date is drawn randomly, or pseudo-randomly, from the interval between the current date Dc and the temporal datum $DS_i$ received.

Alternatively, the new renewal expiration date DRP is equal to the received temporal datum $DS_i$.

In other examples, the new renewal expiration date DRP is set in a sub-interval of the interval between the current date Dc and the received temporal datum $DS_i$. Among these examples are those in which the sub-interval is determined as a function of an identifier of the terminal. For example, the new renewal expiration date DRP is drawn randomly, or pseudo-randomly, from this sub-interval. Alternatively, the new renewal expiration date is taken systematically as equal to the upper bound of this sub-interval.

In some embodiments, the temporal datum $DS_i$ associated with the segment $S_i$ is inserted into a message or a data structure other than the license $L_i$ associated with the same segment. However, this message or this other data structure is transmitted jointly with the segment $S_i$ and with the license $L_i$. For example, the temporal datum is adjacent to each segment transmitted in the stream but does not form part of the data structure forming a license $L_i$.

In some embodiments, each block comprises a single segment. In this particular embodiment, the use of the intermediate key $K_{Gp}$ can be omitted. The license $L_i$ does not then comprise the cryptogram $(K_{si})*K_{Gp}$ and the access right 52 of the license $L_p$ comprises the cryptogram $(K_{si})*K_T$ in place of the cryptogram $(K_{Gp})*K_T$. The person skilled in the art knows how to adapt the method of FIG. 5 to this particular case. More specifically, in step 112, the head end 1 encrypts each key $K_{si}$ with the terminal key $K_T$, to obtain the cryptogram $(K_{si})*K_T$. Then, for each block $G_p$, it inserts, as access right 52 to this block, the cryptogram $(K_{si})*K_T$ into the license $L_p$ intended for the terminal 4. The identifier $Id(K_{Gp})$ of the intermediate key $K_{Gp}$ is also inserted into the license $L_p$. Since the identifier $Id(K_{Gp})$ is also contained in the license $L_i$ associated with any segment $S_i$ of the block $G_p$, the license $L_p$ is thus also associated with each of the segments $S_i$, and therefore with the block $G_p$.

In another embodiment, the blocks have different numbers of segments.

In some embodiments, in step 112, the head end 1 also associates at least one access rule with the block $G_p$. Such an access rule describes what the terminal 4 is allowed to do with the multimedia content, or an identifier that leads to information from which such uses can be derived.

This access rule, or this identifier, jointly with the cryptogram $(K_{si})*K_T$, is inserted, as an access right 52 to this block, into the terminal license $L_p$ intended for the terminal 4. In this case, in step 134, the terminal 4 in addition extracts this access rule from the access right 52 of the license $L_p$ found, then uses this access rule to allow, and, alternately, inhibit, the access of this terminal to the segment $S_i$, that is to say the implementation of step 136. In some of these embodiments, the terminal 4 uses this access rule to allow or inhibit, step 138.

The first and second conditions used in step 142 can also be written, respectively, as $DS_i \geq DS_{i-1}+\Delta T_1$ and $DS_i \leq DS_{i-1}-\Delta T_2$ where $\Delta T_1$ can be zero and $\Delta T_2$ can be equal to a strictly positive multiple of the cryptoperiod. In some examples, $\Delta T_2$ is greater than 3, 10, 30, 60, 100, 200 or 800 times the duration of a cryptoperiod. This last case is used when only less than one segment $S_i$ in two or less than one in five, or less than one in ten, or less than one in fifty is associated with a temporal datum $DS_i$.

Some embodiments omit step 142 altogether. In this case, if, in step 140, the terminal determines that the temporal datum $DS_i$ is different from the pre-stored code, then the method goes directly to step 144. This makes it possible to skip updating the expiration date DRP in step 146.

In some embodiments, step 144 includes drawing the new renewal expiration date DRP randomly or pseudo-randomly from an interval between $DS_i-\Delta Te$ and $DS_i$, where $\Delta Te$ is a positive threshold. For example, $\Delta Te$ is equal to 1, 2, 5, 10, 50, 100 or 500 times the duration of a cryptoperiod.

The new renewal expiration date DRP is set equal to the temporal datum $DS_i$ received. In another example, the new renewal expiration date DRP is set in a subinterval of the interval lying between 0 and the temporal datum $DS_i$ received. For example, the subinterval is determined as a function of an identifier of the terminal. For example, the new renewal expiration date DRP is drawn randomly or pseudo-randomly from this subinterval. Alternatively, the new renewal expiration date is taken systematically as equal to the upper bound of this subinterval.

The invention claimed is:

1. A method comprising providing multimedia content protected by a multimedia-content protection system to a plurality of terminals that are mechanically independent of one another and that are connected to an access-rights server via a wide-area information-transmission network, wherein providing said multimedia content comprises at least one of causing a head-end to execute a sending phase and causing a terminal to execute a receiving phase, wherein said sending phase comprises, at said head end, associating first and second access rights with corresponding first and second blocks of protected multimedia content, wherein each of said first and second blocks comprises one or more segments, wherein said second block follows said first block, wherein said access rights are needed to permit a terminal to play any segment in said blocks, wherein each segment comprises a series of groups of multimedia content, and wherein said multimedia content is selected from the group consisting of video pictures and audio frames, associating a temporal datum with a segment, wherein said temporal datum provides information from which it is possible to determine whether a limit date for transmitting a received access-rights request has changed, and wherein said segment with which said temporal datum is associated is listed in a list of one or more segments, transmitting a first license to a terminal via a point-to-point link, wherein said first license comprises said first access right, transmitting a stream to each of said terminals, wherein said stream comprises each segment of said first block, wherein transmitting to each of said terminals comprises transmitting via a point-to-multipoint link, and transmitting, to said terminal, jointly with each segment of said list of segments of said first block, said associated temporal datum, wherein said receiving phase comprises, at said terminal, receiving said first license, wherein receiving said first license comprises receiving, jointly with each segment of said list of segments of said first block, a temporal datum associated with said segment, receiving said stream, extracting said first access right from said first license, using said first access right perform one of a first action and a second action, wherein said first action comprises authorizing said terminal to access segments of said first block and decrypting said segments, wherein said second action comprises inhibiting said terminal's access to said segments of said first block, upon reaching a predetermined renewal expiration date, transmitting an access-rights request to said access-rights server, receiving a second license from said access-rights server, wherein said second license comprises a second access request, and, prior to reaching said predetermined renewal expiration date, modifying said predetermined renewal date as a function of a last temporal datum received, thereby generating a new predetermined renewal expiration date that allows said terminal to decide, as a function of its value and at a given instant before or at said limit date, which has changed, to transmit an access rights request to said access-rights server.

2. The method of claim 1, wherein any access right comprises an access datum selected from the group consisting of an access rule, an identifier, and an address, wherein said access rule describes uses of the multimedia content that the terminal is authorized to make, wherein said identifier identifies said access rule, and wherein said address is an address of said access rule.

3. The method of claim 1, further comprising causing said head-end to execute said sending phase.

4. The method of claim 1, further comprising causing said terminal to execute said receiving phase.

5. The method of claim 4, wherein said receiving phase further comprises determining whether a condition selected from the group consisting of a first condition and a second condition is true and modifying said predetermined renewal expiration date if and only if said condition is true, wherein said first condition is the condition that $DSt>DSt-1+\Delta T1$ and wherein said second condition is the condition that $DSt \geq DSt-1+\Delta T1$, wherein $DSt$ is said last temporal datum received, wherein $DSt-1$ is the penultimate temporal datum received, and wherein $\Delta T1$ is a first positive or zero predetermined threshold.

6. The method of claim 4 wherein said receiving phase further comprises determining whether a condition selected from the group consisting of a first condition and a second condition is true and modifying said predetermined renewal expiration date if and only if said condition is true, wherein said first condition is that $DSt<DSt-1+\Delta T2$, wherein said second condition is that $DSt \leq DSt-1+\Delta T2$, wherein $DSt$ is said last temporal datum received, wherein $DSt-1$ is the penultimate temporal datum received, and wherein $\Delta T2$ is a second positive or zero predetermined threshold.

7. The method of claim 4 further comprising, at said terminal, assigning, to said predetermined renewal expiration date, a value computed as a function of said last temporal datum received, wherein said function is one that uniformly allocates predetermined renewal expiration dates to said terminals, said uniformly allocated predetermined expiration dates all being contained with a bounded interval having an upper bound that permits said terminal to transmit an access-rights request prior to or at a limit date that has changed, wherein said function uniformly allocates said renewal expiration dates such that all renewal expiration dates are equally probably within any sub-interval of said interval.

8. The method of claim 4 further comprising, at said terminal, comparing said last temporal datum received with a pre-stored code, if said last temporal datum received is equal to said pre-stored code, transmitting said access-rights request to said access-rights server independently of said predetermined renewal expiration date without first modifying said predetermined renewal expiration date as a function of said last temporal datum received, and, otherwise, modifying said predetermined renewal expiration date as a function of said last temporal datum received and transmitting said access-rights request only when said predetermined renewal expiration date has been reached.

9. A manufacture comprising a non-transitory machine-readable medium having encoded thereon instructions for providing multimedia content protected by a multimedia-content protection system to a plurality of terminals that are mechanically independent of one another and that are connected to an access-rights server via a wide-area information-transmission network, wherein said instructions for providing said multimedia content comprises at least one of instructions for causing a head-end to execute a sending phase and instructions for causing a terminal to execute a receiving phase, wherein said sending phase comprises, at said head end, associating first and second access rights with corresponding first and second blocks of protected multimedia content, wherein each of said first and second blocks comprises one or more segments, wherein said second block follows said first block, wherein said access rights are needed to permit a terminal to play any segment in said blocks, wherein each segment comprises a series of groups of multimedia content, and wherein said multimedia content is selected from the group consisting of video pictures and audio frames, associating a temporal datum with a segment, wherein said temporal datum provides information from which it is possible to determine whether a limit date for transmitting a received access-rights request has changed, and wherein said segment with which said temporal datum is associated is listed in a list of one or more segments, transmitting a first license to a terminal via a point-to-point link, wherein said first license comprises said first access right, transmitting a stream to each of said terminals, wherein said stream comprises each segment of said first block, wherein transmitting to each of said terminals comprises transmitting via a point-to-multipoint link, and transmitting, to said terminal, jointly with each segment of said list of segments of said first block, said associated temporal datum, wherein said receiving phase comprises, at said terminal, receiving said first license, wherein receiving said first license comprises receiving, jointly with each segment of said list of segments of said first block, a temporal datum associated with said segment, receiving said stream, extracting said first access right from said first license, using said first access right perform one of a first action and a second action, wherein said first action comprises authorizing said terminal to access segments of said first block and decrypting said segments, wherein said second action comprises inhibiting said terminal's access to said segments of said first block, upon reaching a predetermined renewal expiration date, transmitting an access-rights request to said access-rights server, receiving a second license from said access-rights server, wherein said second license comprises a second access request, and, prior to reaching said predetermined renewal expiration date, modifying said predetermined renewal date as a function of a last temporal datum received, thereby generating a new predetermined renewal expiration date that allows said terminal to decide, as a function of its value and at a given instant before or at said limit date, which has changed, to transmit an access rights request to said access-rights server.

10. An apparatus for providing multimedia content protected by a multimedia-content protection system, said apparatus comprising one of an access-rights server and a terminal, wherein said access-rights server comprises a head end, wherein said terminal is one of a plurality of terminals that are mechanically independent of one another and that are connected to said access-rights server via a wide-area information-transmission network, wherein said head end executes a sending phase, wherein said terminal executes a receiving phase, wherein said sending phase comprises, at said head end, associating first and second access rights with corresponding first and second blocks of protected multimedia content, wherein each of said first and second blocks comprises one or more segments, wherein said second block follows said first block, wherein said access rights are needed to permit a terminal to play any segment in said blocks, wherein each segment comprises a series of groups of multimedia content, and wherein said multimedia content is selected from the group consisting of video pictures and audio frames, associating a temporal datum with a segment, wherein said temporal datum provides information from which it is possible to determine whether a limit date for transmitting a received access-rights request has changed, and wherein said segment with which said temporal datum is associated is listed in a list of one or more segments, transmitting a first license to a terminal via a point-to-point link, wherein said first license comprises said first access right, transmitting a stream to each of said terminals, wherein said stream comprises each segment of said first block, wherein transmitting to each of said terminals comprises transmitting via a point-to-multipoint link, and transmitting, to said terminal, jointly with each segment of said list of segments of said first block, said associated temporal datum, wherein said receiving phase comprises, at said terminal, receiving said first license, wherein receiving said first license comprises receiving, jointly with each segment of said list of segments of said first block, a temporal datum associated with said segment, receiving said stream, extracting said first access right from said first license, using said first access right perform one of a first action and a second action, wherein said first action comprises authorizing said terminal to access segments of said first block and decrypting said segments, wherein said second action comprises inhibiting said terminal's access to said segments of said first block, upon reaching a predetermined renewal expiration date, transmitting an access-rights request to said access-rights server, receiving a second license from said access-rights server, wherein said second license comprises a second access request, and, prior to reaching said predetermined renewal expiration date, modifying said predetermined renewal date as a function of a last temporal datum received, thereby generating a new predetermined renewal expiration date that allows said terminal to decide, as a function of its value and at a given instant before or at said limit date, which has changed, to transmit an access rights request to said access-rights server.

11. The method of claim 1, wherein any access right comprises an access datum selected from the group consisting of a cryptographic key, an identifier, and an address, wherein said cryptographic key is necessary to access any segment of said block of multimedia content with which said access right is associated, wherein said identifier identifies said cryptographic key, and wherein said address is an address of said cryptographic key.

12. The method of claim 1, wherein any access right comprises an access datum that comprises an initialization value, wherein said initialization value is a value that makes it possible to compute a cryptographic key that is necessary to access any segment of said block of multimedia content with which said access right is associated.

* * * * *